(12) United States Patent
Yokota et al.

(10) Patent No.: US 6,718,060 B1
(45) Date of Patent: Apr. 6, 2004

(54) CHARACTER RECOGNIZER

(75) Inventors: Toshimi Yokota, Hitachiota (JP); Soshiro Kuzunuki, Hitachinaka (JP); Masaki Miura, Hitachi (JP); Keiko Gunji, Hitachi (JP); Koyo Katsura, Hitachiota (JP)

(73) Assignee: Renesas Technology Corporation, Tokyo (JP)

( * ) Notice: Subject to any disclaimer, the term of this patent is extended or adjusted under 35 U.S.C. 154(b) by 0 days.

(21) Appl. No.: 09/509,076

(22) PCT Filed: Sep. 22, 1998

(86) PCT No.: PCT/JP98/04255
§ 371 (c)(1),
(2), (4) Date: Jun. 13, 2000

(87) PCT Pub. No.: WO99/16013
PCT Pub. Date: Apr. 1, 1999

(30) Foreign Application Priority Data

Sep. 22, 1997 (JP) .............................. 9-256433

(51) Int. Cl.[7] .............................. G06K 9/00; G06K 9/46; G06K 9/68
(52) U.S. Cl. .................. 382/187; 382/195; 382/218
(58) Field of Search ................... 382/185, 186, 382/187, 189, 190, 195, 197, 198, 193, 209, 217, 218

(56) References Cited

U.S. PATENT DOCUMENTS

| | | | | |
|---|---|---|---|---|
| 5,684,892 A | * | 11/1997 | Taguchi | .............. 382/193 |
| 6,038,343 A | * | 3/2000 | Shimizu et al. | ............. 382/187 |
| 6,104,833 A | * | 8/2000 | Naoi et al. | .................. 382/190 |

FOREIGN PATENT DOCUMENTS

| | | | |
|---|---|---|---|
| JP | 6113384 | 1/1986 | |
| JP | 61-013384 | 1/1986 | |
| JP | 63-241679 | 10/1988 | |
| JP | 256689 | 2/1990 | |
| JP | 02-056689 | 2/1990 | |
| JP | 05-108883 | 4/1993 | |
| JP | 06-309506 | 11/1994 | |
| JP | 962788 | 3/1997 | |
| JP | 09 062788 A | * 3/1997 | ............ G06K/9/62 |
| JP | 9114927 | 5/1997 | |
| JP | 09-114927 | 5/1997 | |
| JP | 9179938 | 7/1997 | |
| JP | 09 179938 | * 7/1997 | ............ G06K/9/62 |

* cited by examiner

*Primary Examiner*—Mehrdad Dastouri
(74) *Attorney, Agent, or Firm*—Antonelli, Terry, Stout & Kraus, LLP

(57) ABSTRACT

A character recognizing apparatus capable of recognizing discriminatively characters written continuously, irregularly and/or containing modification is provided which apparatus includes an input unit for allowing a handwritten character to be inputted to thereby output coordinate-points string, a dictionary for storing therein a plurality of character codes and character patterns corresponding to the character codes, respectively, an element decomposition module for decomposing the coordinates string outputted from the input unit into a plurality of elements which constitute the character, and a matching module for determining corresponding distance values for the elements of the character pattern stored in the dictionary and the elements of character pattern of the inputted character for each of the character patterns stored in the dictionary, to thereby correct the distance values determined on the basis of the elements bearing no correspondence.

3 Claims, 15 Drawing Sheets

INPUTTED PATTERN

DICTIONARY PATTERN 1

DICTIONARY PATTERN 2

CHARACTER RECOGNIZER

TECHNICAL FIELD

The present invention relates to a handwritten character recognizing apparatus for recognizing handwritten letters or characters on an online basis.

BACKGROUND ART

A technique for recognizing characters such as simplified characters and cursive characters is described in JP-A-2-56689. More specifically, straight lines extending in one direction are extracted from strings of coordinate points which constitute a character. The straight lines extracted are sorted for selecting out a straight line of a large length as a substroke S1. Subsequently, the other line segments than the selected one are set as substrokes S2, whereon recognition is performed by making decision as to presence of a corresponding character in a dictionary on the basis of positions and shapes of the substrokes S1 and S2.

With the conventional technique mentioned above, character recognition is performed on the basis of shapes and dispositions of strokes represented by the coordinates strings which constitute a character pattern. However, the conventional technique suffers problems such as mentioned below because the recognition is performed on the basis of all the coordinates strings.

In general, incapability of recognizing the cursive characters and the simplified characters can be ascribed to the difference between the character patterns inputted and the character patterns stored in the dictionary. When a character is written cursively or continuously, extraneous elements or portions may be inputted, as a result of which the inputted character may present a shape which is utterly different from that of a relevant character pattern stored in the dictionary. Consequently, in order to make it possible to recognize the cursively or continuously written character, it is necessary to discriminatively determine which portions of the inputted character pattern are required for the character recognition and which portions are not required for the recognition. Thus, difficulty is encountered in recognizing properly or satisfactorily the cursively written characters even when the recognition is performed on the basis of all the coordinates.

With a view to solving the problem mentioned above, it is an object of the present invention to provide a character recognizing apparatus which is capable of recognizing even the cursive characters written roughly in incorrect or irregular order and containing modifications and which apparatus can lessen the load involved in the processing.

DISCLOSURE OF INVENTION

For achieving the object mentioned above, the character recognizing apparatus according to the present invention is characterized in that it includes an input unit for allowing a handwritten character to be inputted to thereby output a coordinate-points string or strings, a dictionary for storing therein a plurality of character codes and character patterns corresponding to the character codes, respectively, an element decomposition module for decomposing the coordinates string outputted from the input unit into a plurality of elements which constitute the character, a matching module for determining corresponding distance values for elements of a character pattern stored in the dictionary and elements of the inputted character pattern for each of character patterns stored in the dictionary and correcting the determined distance values on the basis of the elements which bear no correspondency, and a processing unit for displaying on a display unit the character pattern for which the distance values are determined small.

BEST MODES FOR CARRYING OUT THE INVENTION

In the following, description will be made of an online-type handwritten character input apparatus according to the present invention by reference to the drawings.

Figure 1:
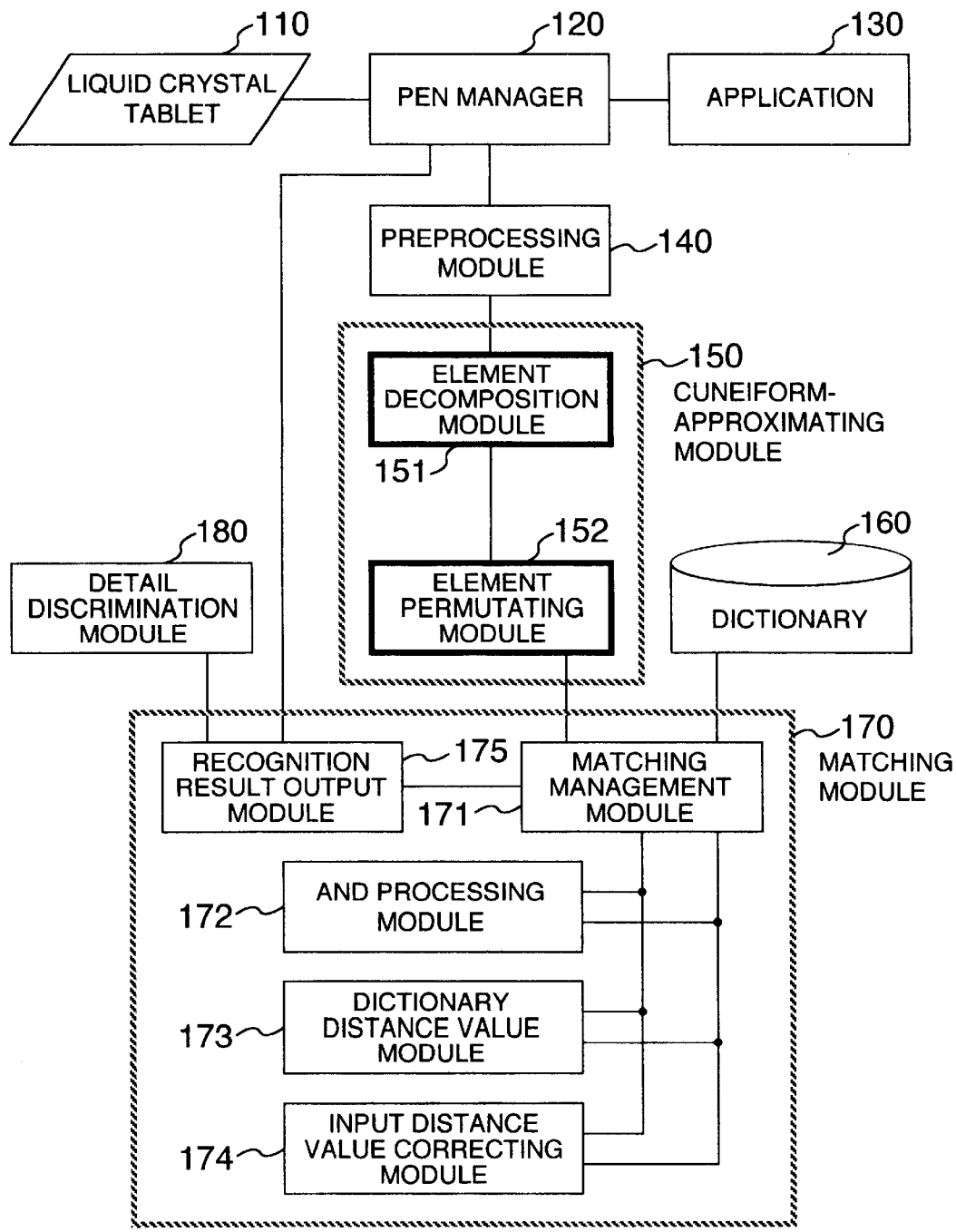
FIG. 1 is a view showing a configuration of a system according to the present invention.
Figure 2:
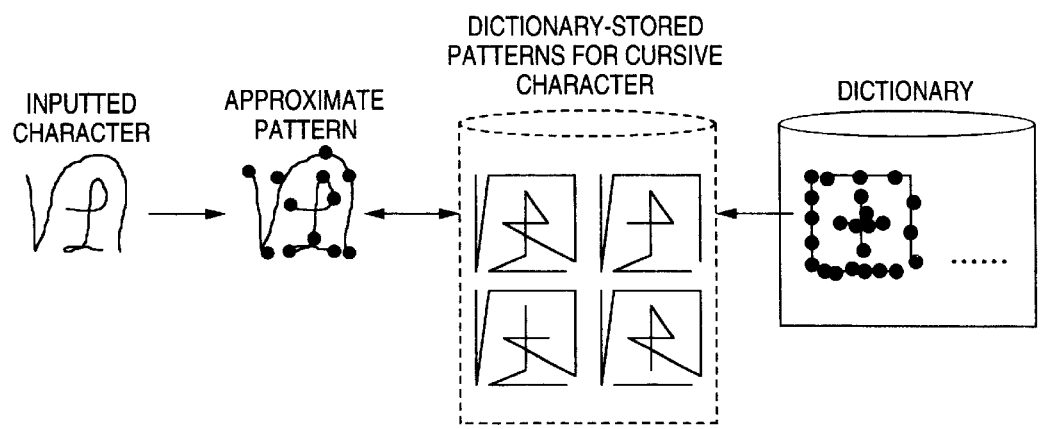
FIG. 2 is a view showing a conventional scheme of character recognition.
Figure 3:
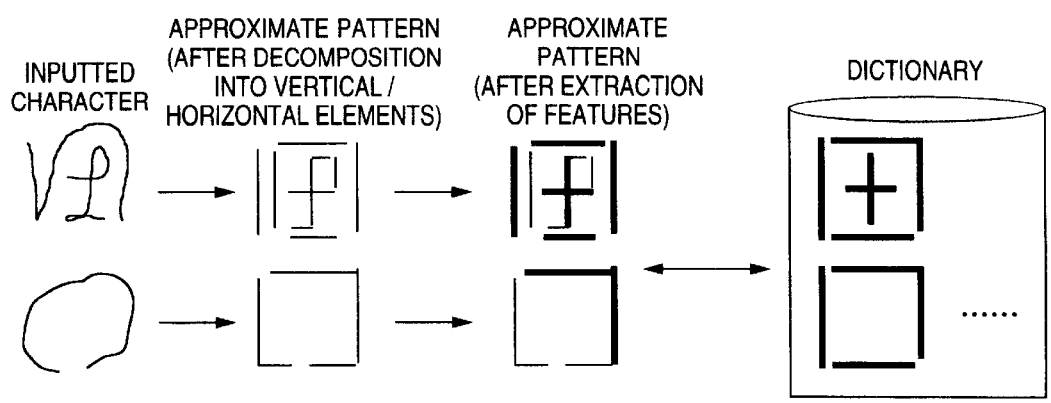
FIG. 3 is a view showing a scheme of character recognition according to the present invention.

FIG. 1 shows an online-type handwritten character input apparatus according to the present invention. A liquid crystal tablet 110 is composed of an input field and a display field. When the user inputs a character on the liquid crystal tablet by handwriting, the character inputted is detected to be transferred to a pen manager 120 as a time-serial coordinate-points string. Upon reception of the time-serial coordinate-points string from the liquid crystal tablet 110, the pen manager 120 transfers the coordinate-points string to a preprocessing module 140 when the coordinate-points string is decided as being destined for the character recognition in the light of field attributes of the liquid crystal tablet 110 which are defined by an application 130. To this end, the application 130 is designed for executing an application program for dividing a display area on the liquid crystal tablet 110 into several fields while defining the field attributes thereof. By way of example, a part of the image screen of the liquid crystal tablet may be defined as the character input field. The preprocessing module 140 is designed to receive the time-serial coordinate-points string from the pen manager 120 to perform a sampling processing on the coordinate-points string having a thin portion in correspondence to a high writing speed and a dense portion corresponding to a low writing speed for thereby making uniform the density of the coordinate-points string and additionally perform normalization with regard to position and size. The coordinate-points string normalized in respect to the position and the size and having the density uniformized in this way is inputted to a cuneiform approximating module 5.

The cuneiform approximating module 150 is composed of an element decomposition module 151 and an element permutating module 152.

The element decomposition module 151 is designed to generate line segments from the coordinate-points string having the density uniformized by the preprocessing module 140 to thereby execute a pattern matching processing. The line segments as generated are transferred to the element permutating module 152. In the element permutating module 152, the line segments are arrayed such that line-segment elements extending upwardly or downwardly are arrayed orderly from the topmost with the line-segment elements extending rightwards or leftwards being arrayed orderly from the leftmost in dependence on the positions. In that case, the line-segment elements are arrayed orderly in dependence on the length thereof so that correspondence to the dictionary can be established on the basis of the positions of the strokes even for the character written in an incorrect or irregular stroke sequence. The result of this orderly positioning process are held as it is, while the line-segment element string and the line-segment positional order data are transferred to a matching module 170.

The matching module 170 is designed to carry out a dictionary matching process on the basis of the line-segment element series and the line-segment positional order data sent from the cuneiform approximating module 150 to thereby extract from the dictionary a character which approximates the character pattern inputted by handwriting by way of the liquid crystal tablet 110, whereon the character extracted is displayed in the display field on the liquid crystal tablet 110. Parenthetically, the dictionary 160 holds therein line-segment element series obtained from the coordinate-points strings of character patterns through cooperation of the preprocessing module 140 and the cuneiform approximating module 150 together with character codes while establishing correspondences between the line-segment element series and the character codes.

The matching module 170 is comprised of a matching manage module 171, an AND processing module 172 for determining distance values between the line-segment element series of the inputted character pattern and character patterns stored in the dictionary, a dictionary distance value correcting module 173 for extracting the line-segment elements existing only in the dictionary for thereby correcting the distance value, an input distance value correcting module 174 for extracting the line-segment element(s) existing only in the input pattern for thereby correcting the distance value, and a recognition result output module 175 for extracting the result of recognition on the basis of the distance values obtained from the AND processing module 172, the dictionary distance value correcting module 173 and the input distance value correcting module 174 for thereby displaying the result of recognition in the display field on the liquid crystal tablet 110.

The matching manage module 171 is designed to read out the character patterns stored in the dictionary 160 one by one therefrom for thereby allowing the distance value relative to the inputted character pattern to be subsequently computed by the AND processing module 172, the dictionary distance value correcting module 173 and the input distance value correcting module 174. More specifically, upon reception of the line-segment element series of the inputted character pattern and the dictionary-stored character pattern from the cuneiform approximating module 150 and the dictionary 160, respectively, the matching manage module 171 transfers the received data to the AND processing module 172, the dictionary distance value correcting module 173 and the input distance value correcting module 174 for thereby allowing the distance value between the inputted character pattern and the dictionary-stored character pattern to be arithmetically determined while correcting the distance value, whereby identifier or ID of the dictionary-stored character pattern and the relevant distance value are transferred to the recognition result output module 175.

The AND processing module 172 is designed such that upon comparison of the line-segment element series of the dictionary pattern with the line-segment element series of the input character pattern separately for the vertical line-segment elements or the horizontal line-segment elements, the AND processing module establishes correspondences between the line-segment elements of the character pattern of the dictionary and the line-segment elements of the inputted character pattern which are located closely in respect to the position (i.e., in view of the positional order resulting from the permutation performed by the element permutating module 171) to thereby classify three different types of cases, i.e., (1) the case where the element or elements corresponding to the inputted character pattern are found in the character pattern stored in the dictionary, (2) the case where the line-segment element or elements corresponding to the inputted character pattern are not found in any character pattern stored in the dictionary, and (3) the case where the line-segment element or elements corresponding to the character pattern stored in the dictionary are not found in the inputted character pattern, respectively, whereon the distance values between the line-segment elements are determined with a total sum of these distance values being set as the ultimate distance value. In the cases (2) and (3) mentioned above, the distance values are determined for detail by the dictionary distance value correcting module 173 and the input distance value correcting module 174. Thus, for the present, the distance values are presumed to be constant in the cases (2) and (3) mentioned above. The result of the processing, i.e., the correspondences established between the line-segment elements and the distance values determined between the line-segment elements, are transferred to the dictionary distance value correcting module 173 by way of the matching manage module 171. At this juncture, it should be mentioned that when the distance value becomes excessively large, the processing performed for the relevant dictionary-stored pattern may be terminated with a message to such effect being sent to the matching manage module 171. The dictionary distance value correcting module 173 is provided with a view to taking into consideration modifications of the inputted character pattern. When modification and/or cursive writing is so serious that omission of some portion is incurred, there may arise such situation that the inputted character pattern lacks in the line-segment element(s) which corresponds to the line-segment element(s) of the character pattern stored in the dictionary. To cope with such situation, for the input character pattern detected as lacking in the line-segment element which corresponds to the line-segment element of the dictionary character pattern as the result of the AND processing performed by the module 172, (1) search is performed for other line-segment element than those of the inputted character pattern to thereby determine the distance value for the searched line-segment element, if found, and (2) if otherwise, the distance value conforming to the size of the relevant line-segment element of the dictionary character pattern is set, whereon the distance value determined in this way is set instead of the predetermined constant value set by the AND processing module 172. The reason why the distance value conforming to the size is employed can be explained by the fact that large line-segment element is scarcely omitted while small line-segment element is likely to be omitted. Then, the distance value determined in this way is set in place of the predetermined constant value assigned by the AND processing module 172. The results of the processing, i.e., the correspondences established between the line-segment elements and the distance values determined between the line-segment elements, are transferred to the input distance value correcting module 174 by way of the matching manage module 171.

The input distance value correcting module 174 is also provided with a view to taking into account the cursive writing of the inputted character. When a cursively or continuously written character is inputted, the line-segment element which corresponds to the continuously written portion of the inputted character pattern may not be found in the dictionary-stored character pattern. In that case, when line-segment elements for which correspondence with the dictionary-stored character pattern can be established exist in the inputted character pattern in precedence and succession to the line-segment element thereof for which correspondence can not be established, as viewed along the series of line-segment elements of the character pattern arrayed in the writing order, then the first-mentioned line-segment elements may duly be interpreted as being written in continuation. Then, for the line-segment elements capable of being interpreted as the continuously written portion, a small distance value is assigned. If otherwise, a large distance value is assigned. Subsequently, the predetermined constant value set by the AND processing module 172 is replaced by the distance value mentioned just above. The correspondences between the line-segment elements and the distance values between the line-segment elements obtained as the result of the processing described above are transferred to the matching manage module 171.

Upon reception of the ID of the dictionary-stored character pattern or character code and the relevant distance values from the matching manage module 171, the recognition result output module 175 selects small distance values to array then in the value-based order, which represents the result of the recognition processing. The result of recognition is once transferred to the detail discrimination module 180, and upon reception of the result of recognition sent back from the detail discrimination module, the recognition result output module outputs it to the pen manager 2.

The detail discrimination module 180 is provided with a view to taking into account even such character features which make disappearance in the series of the line-segment elements as outputted from the element decomposition module 151 to thereby permutate orderly the result of recognition by taking into consideration the above-mentioned character features as well. More specifically, upon reception of the ID or character code of the dictionary character pattern to which a small distance value is assigned and the relevant distance values thereof from the recognition result output module 175 as the result of recognition processing, the detail discrimination module 8 checks the input pattern with regard to the detail features of the dictionary pattern, to thereby permutate orderly the result of recognition, as occasion requires, which is then transferred to the recognition result output module 175.

In the following, the instant embodiment will be described in conjunction with operation procedure.

Figure 4:
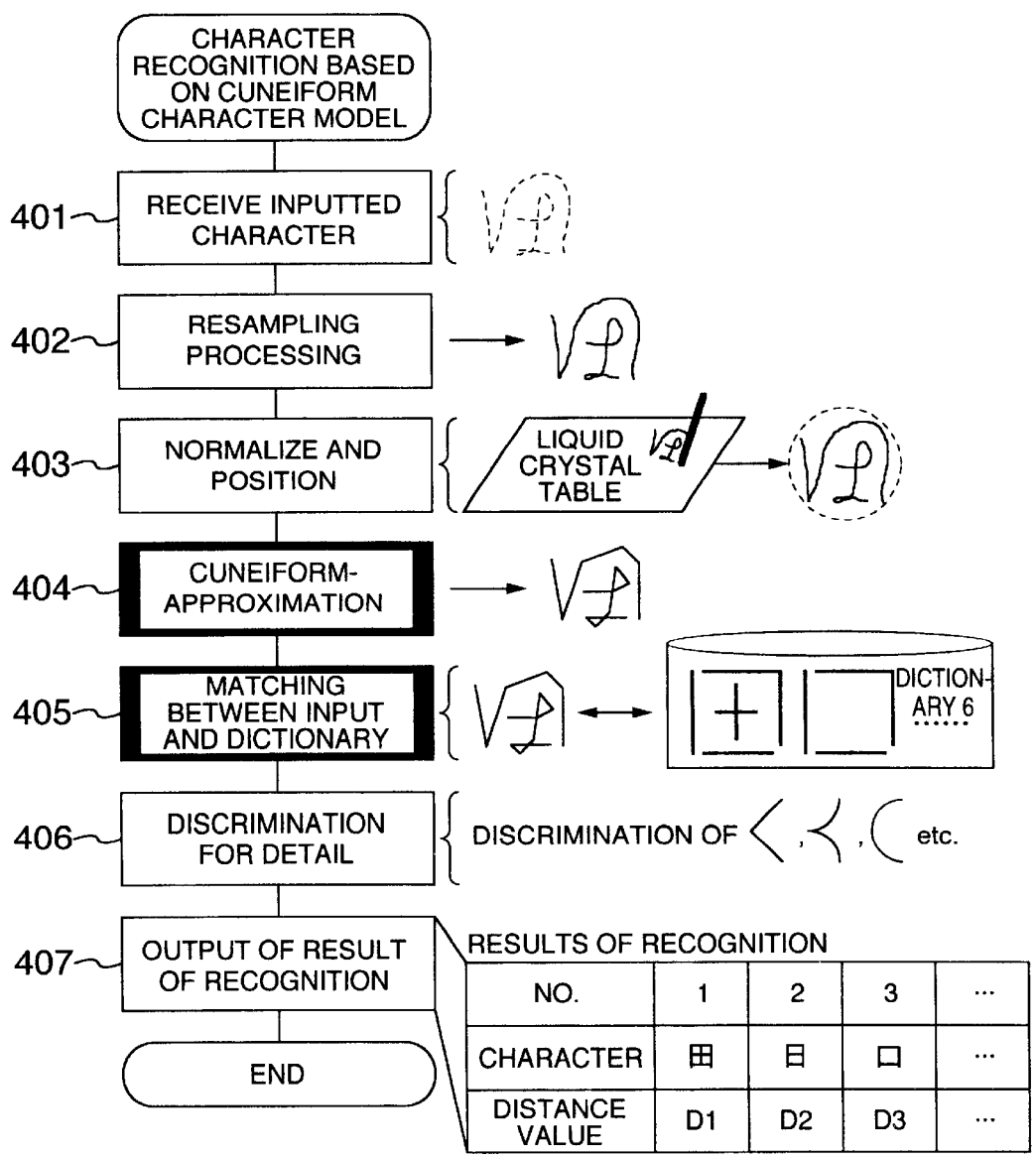
FIG. 4 is a view showing processings as a whole which are executed in the system according to the present invention.

FIG. 4 illustrates a flow of processings as a whole executed by the online-type handwritten character input apparatus according to the present invention.

In a processing 401, a character pattern inputted by the user in handwriting is fetched as a time-serial coordinate-points string through cooperation of the liquid crystal tablet 110, the pen manager 120 and the application 130. In processing steps 402 and 403, a sampling processing is performed on the coordinate-points string which may have thin portions corresponding to high writing speed and dense portions corresponding to low writing speed, for thereby making uniform the density of the coordinate-points string while executing normalization with regard to the position and the size by the preprocessing module 140. For normalization of the coordinate-points string with regard to the position and size thereof, a centroid of the character pattern, by may of example, may be determined from the coordinate-points string of the inputted character pattern, whereon the position of the character pattern is normalized by translating it so that the centroid overlaps with the origin, which is then followed by normalization of the size by magnifying or contracting the pattern so that the mean value of the distances to the individual coordinate points from the centroid (=origin) assumes a constant value.

Next, in a processing 404, a cuneiform approximation processing is carried out by the cuneiform approximating module 150.

Figure 5:
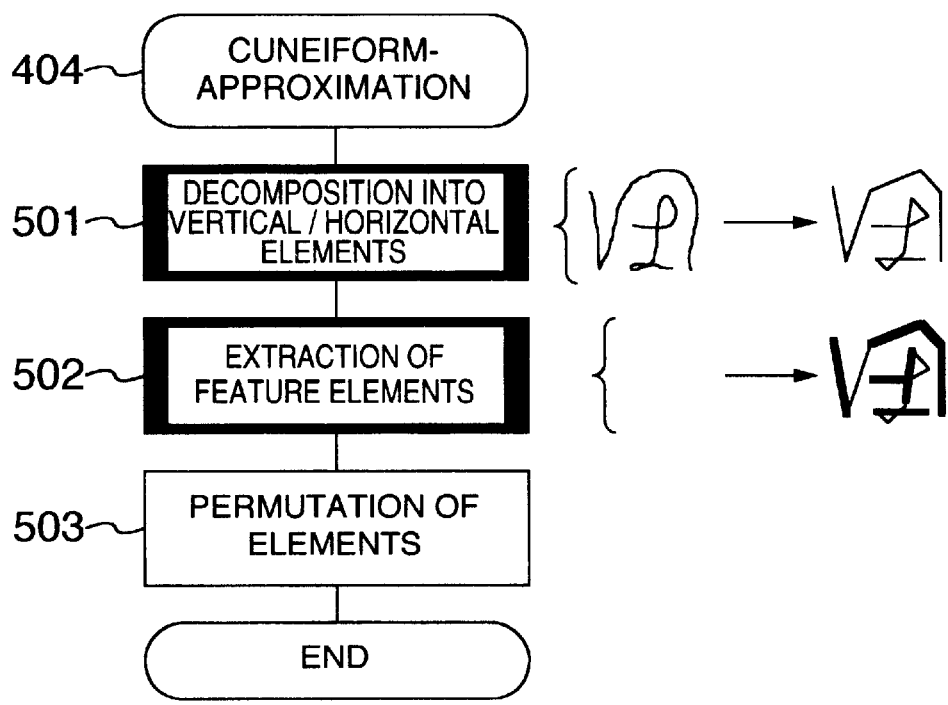
FIG. 5 is a view showing a cuneiform approximation processing in FIG. 4.

In the cuneiform approximation processing, a vertical/horizontal element decomposition processing 501 for decomposing the input pattern into vertical/horizontal line-segment elements is performed, which is then followed by execution of an element permutating processing 503 for permutating the line segments decomposed into the vertical/horizontal line-segment elements, as is illustrated in FIG. 5.

Figure 6A:
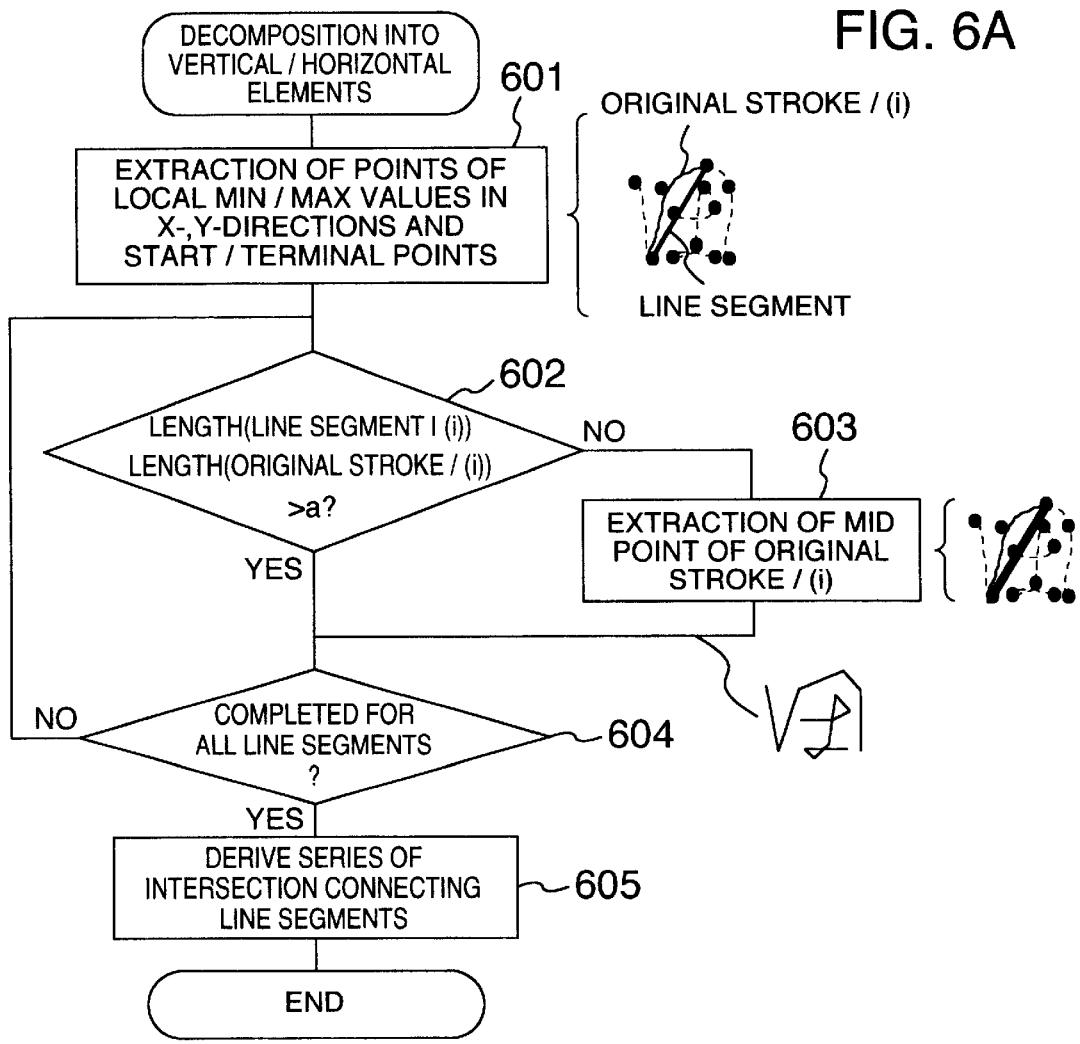
FIGS. 6A and 6B are views showing a vertical/horizontal element decomposition processing in FIG. 5.

FIG. 6A shows a processing flow for the vertical/horizontal element decomposition processing 501.

Figure 15A:
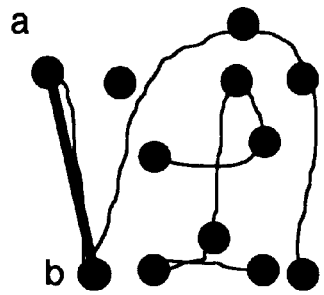
FIGS. 15A to 15F are views for illustrating a processing scheme.
Figure 15B:
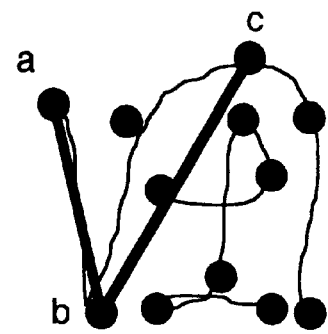
Figure 15C:
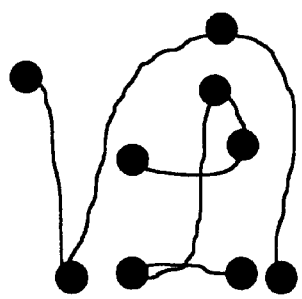

Through a processing 601, the line segments are determined by extracting the points which assume local MIN/MAX values as well as the start/terminal points in the x-axis and y-axis directions from the inputted character pattern. More specifically, referring to FIG. 15A, when the coordinate-points string is traced, starting from the start point a inputted by the user, the y-axis coordinate assumes a minimum value at a point b. Subsequently, when the coordinate-points string is traced, starting from the point b, the y-axis coordinate value becomes maximum at a point c (FIG. 15B). The result of determination of the local MIN/MAX values in the x-axis and y-axis directions in this manner will be such as illustrated in FIG. 15C.

Figure 15D:
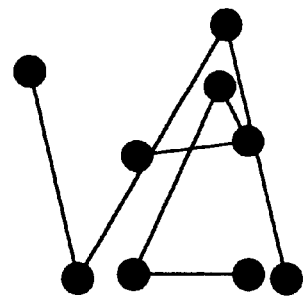

However, the pattern obtained by interconnecting the points of the local MIN/MAX values in the x-axis and y-axis directions differs distinctly from the character pattern inputted by the user, as can be seen from FIG. 15D. For this reason, the processing for making the character pattern shown in FIG. 15C approximate closely to the character pattern inputted by the user is performed through processings 602 to 604.

Figure 15E:
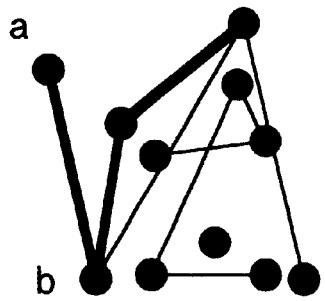
Figure 15F:
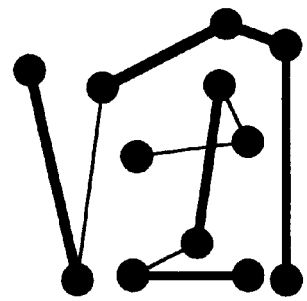

In the processings 602 to 605, decision is made that the segment-based approximation is insufficient when the ratio between length of the line segment and that of the coordinate-points string representing the original stroke is decided to be smaller than a predetermined threshold value a for every line segment constituted by the points as determined. In that case, interpolation is performed by using the midpoint of the original stroke as the approximate point. FIG. 15E shows that since the ratio of length between the line segment 1 and the original stroke 2 is smaller than the predetermined threshold value, the approximate point d is interpolated. A result of such interpolation is illustrated in FIG. 15F.

Finally, in the processing 606, the points determined through the processings 601 to 605 are interconnected to thereby determine a line-segment series.

Figure 6B:
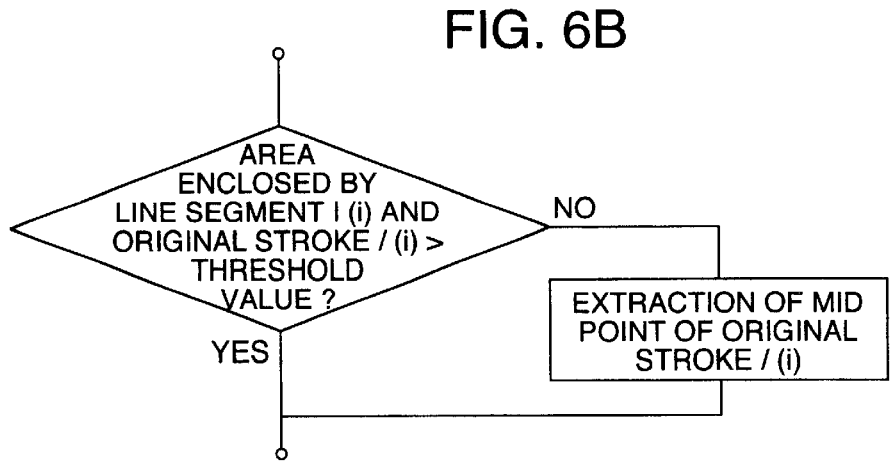

In this conjunction, the processing for interpolating the approximate points may be executed such that the area enclosed by the line-segment element and the original stroke is determined and then the approximate points are interpolated when the area as determined is greater than a predetermined threshold value, as illustrated in FIG. 6B.

The line-segment series determined in this way are permutated through the processing step 502 shown in FIG. 5, whereon matching of the input with the dictionary is performed through the processing step 405 shown in FIG. 4.

Figure 7A:
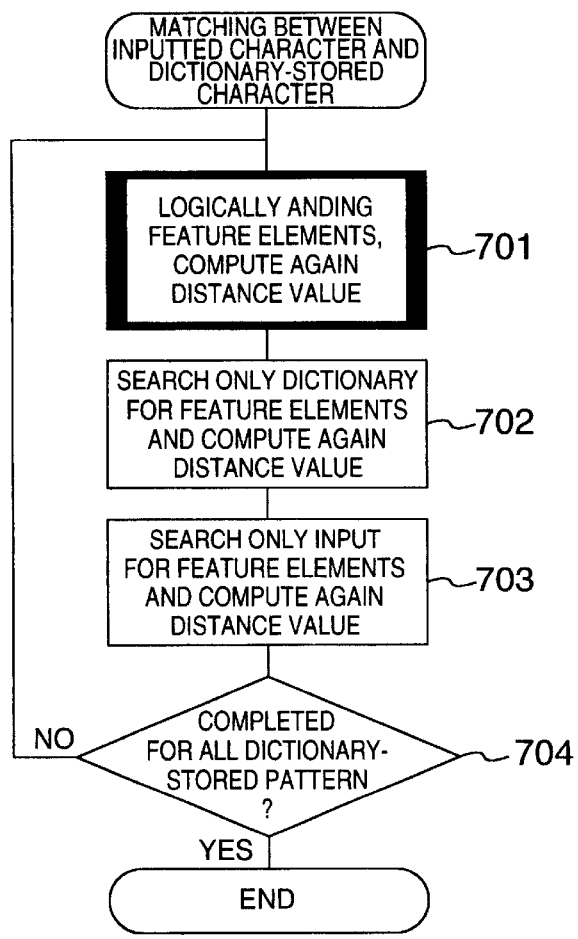
FIGS. 7A to 7C are views showing an input/dictionary matching processing in FIG. 4.

Details of the processing for matching the input pattern with the dictionary-stored pattern are illustrated in FIG. 7A.

Figure 7B:
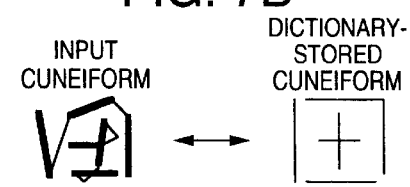

With this processing, it is presumed that the distance values between a line-segment series and all the dictionary patterns are determined. In a processing 701, distance value for the elements for which coincidence is found between the coordinate-points string and the dictionary pattern is arithmetically determined. By way of example, for a character pattern indicated by an input cuneiform in FIG. 7A and a character pattern indicated by a dictionary cuneiform, thick solid line portions shown in FIG. 7B represent ANDed portions for which the two patterns coincide with each other. Accordingly, the distance values for these portions are arithmetically determined.

Figure 8A:
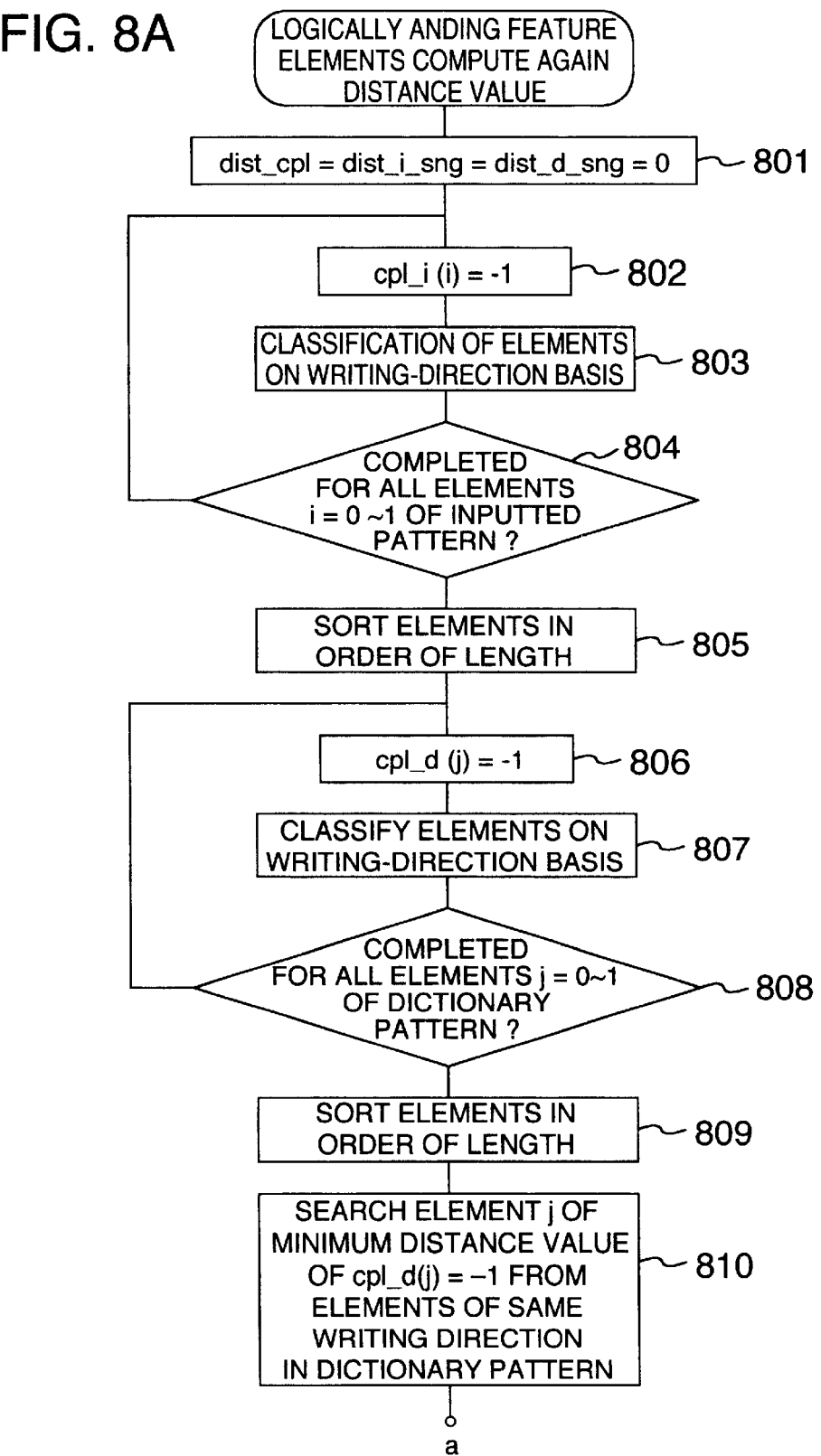
FIGS. 8A and 8B are views showing a feature-ANDing distance value arithmetic processing in FIGS. 7A to 7C.
Figure 8B:
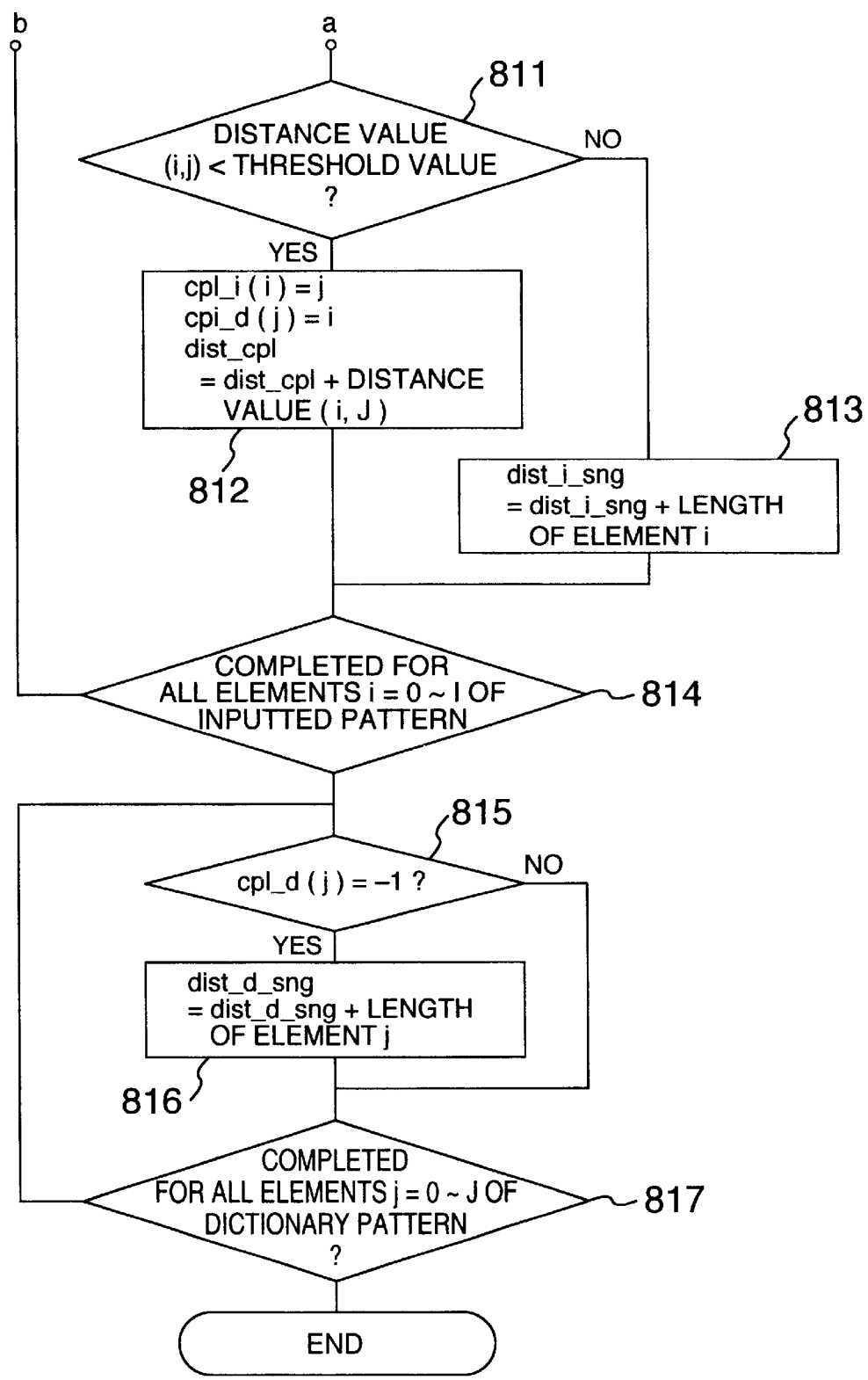

A processing step 701 for determining arithmetically the distance value by logically ANDing these feature elements is illustrated in detail in FIGS. 8A and 8B.

In a processing 801, "$dist_{13}$ cpl", "$dist_{13}$ $i_{13}$ sng" and "$dist_{13}$ $d_{13}$ sng" are initialized. In this conjunction, "$dist_{13}$ cpl" represents a variable for holding the distance values for the line segment element of the input pattern and the element of the dictionary pattern for which correspondence can be established. In more concrete, in the case of the example illustrated in FIG. 7B, this variable represents the distance values for the portions indicated by thin solid lines. On the other hand, "$dist_{13}$ $i_{13}$ sng" represents a variable for holding the distance values for the elements of the input pattern for which correspondence to the elements of the dictionary pattern can not be established. In the case of the example illustrated in FIG. 7B, this corresponds to portions of the input pattern indicated by thin solid lines. Furthermore, "$dist_{13}$ $d_{13}$ sng" represents a variable for holding the distance values for the element of the input pattern and the element of the dictionary pattern for which correspondence can not be established.

Subsequently, "$cpl_{13}$ i(i)" is initialized to "−1" through processings 802 to 804. In this conjunction, "$cpl_{13}$ i(i)" represents a variable for holding the element ID number j of the element of the dictionary pattern for which correspondence to the line segment element i of the input pattern can be established. The variables are classified into four direction groups "↓", "→", "↑", and "←" in dependence on the writing directions of the elements. By virtue of such classification, element j of a dictionary pattern for which correspondence to the element i of the input pattern is to be established can be searched speedily from the same classified group in the succeeding processing 810. Incidentally, such classification may be spared.

Subsequently, the elements as classified are sorted in accordance with the line segment length in a processing 805. Owing to such sort processing, the element j of the dictionary pattern for which correspondence is to be established relative to the element i of the input pattern in the processing 810 can be detected speedily by performing the search in the sorted order. Incidentally, such sorting may be spared.

In succession, through the processings 806 to 808, "$cpl_{13}$ d(j)" is initialized to "−1" and the elements are classified into four direction groups "↓", "→", "↑", and "←" on a writing-direction basis similarly to the processings 802 to 804.

Subsequently, in the processings 810 to 814, matching is performed. At first, in the processing 810 for searching the dictionary pattern element j to which correspondence to the element i of the input pattern is to be established, the element j of the dictionary pattern which is classified into the same writing direction as the element i of the input pattern and which satisfies the condition that $cpl_{13}$ d(j)=−1, i.e., the element for which the distance value is smallest among the elements for which no correspondence to any one of the input elements has not been established yet, is searched. To this end, the distance value can be arithmetically determined in accordance with, for example, the undermentioned expression for the line segment for which the starting point of the input pattern element i is given by (xis, yis) with the terminal point thereof being given by (xie, yie) and for which the starting point of the dictionary pattern element j is given by (xjs, yjs) with the terminal point thereof being given by (xje, yje).

$$\begin{aligned}\text{Distance value } (i, j) = \\ = a*(|xis - xjs| + |yis - yjs| + |xie - xje| + \\ |yie - yje|) + \\ b*(|xie - xis) - (xje - xjs)| + |(yie - yis) - \\ (yje - yjs)|\end{aligned}$$

Figure 13A:
FIGS. 13A to 13C are views for illustrating a processing scheme.
Figure 13B:
Figure 13C:

In the above expression, the first term is for determining the difference between the position of the line segment i of the inputted character pattern and the position of the line segment of the dictionary-stored character pattern and is indispensably required for the character recognition without resorting to the use of information concerting the writing order. If otherwise, it will be impossible to recognize such input pattern as "≡" illustrated in FIGS. 13A to 13C.

Figure 14:
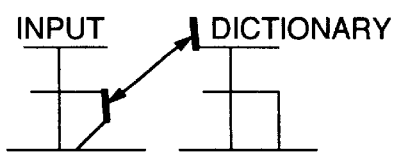
FIG. 14 is a view for illustrating a processing scheme.

In the processing 811, the distance value (i, j) obtained through the processing 810 is compared with a threshold value to thereby decide whether the correspondence established for (i, j) is correct or not. This processing 811 is effective for preventing elements of noise components inputted due to unintentional stroke or the like from being erroneously recognized as having a significant distance value with correspondence being established, as is illustrated in FIG. 14. When it is decided in the processing 811 that the correspondence as established is correct, then "$cpl_{13}$ i(i)" and "$cpl_{13}$ d(j)" are set to the respective element ID numbers j, and i and the distance value (i, j) is added to "$dist_{13}$ cpl" in the processing 812. On the other hand, when it is decided through the processing 813 that the correspondence as established is incorrect, then the length of the element i is added to "dist$_{13}$ i$_{13}$ sng" as the distance value indicating that correspondence can not be established for the input pattern element i in the processing 814. To this end, a given constant may be employed in place of the length or alternatively a function having the length as a parameter may be employed.

Use of the function having the length as a parameter is effective not only because the distance value can be suppressed for such noise element as illustrated in FIG. 14 but because a large distance value can be assigned in the case where correspondence can not be established for the line segment which occupies a large proportion of the character.

Subsequently, through the processings 815 to 817, "cpl$_{13}$ d(j)" is checked for all the line segments "j=0 to J" of the dictionary-stored pattern, and for the line segments of "−1", i.e., those for which correspondence with the line segment(s) of the inputted character pattern can not be established, the distance value is added to "dist$_{13}$ d$_{13}$ sng" in the processing 817 as in the case of the processing 814.

In this manner, the distance values are calculated for the correspondence-established assigned features of the inputted character pattern and the dictionary-stored character pattern.

Subsequently, in the processing 702 shown in FIG. 7A, the line segment search is performed only for the dictionary to thereby calculate again the distance value. In the case of the example illustrated in FIG. 7C, there remains no line segments of the character pattern of the dictionary for which correspondences to the line segments of the inputted character pattern could not be established. However, when such line segment is found, then the processing similar to the processing 703 may be carried out as described below.

Figure 7C:
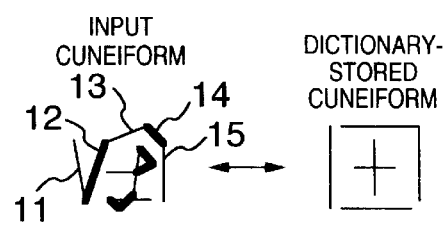

In the processing 703, search for the feature elements is performed only for the inputted character pattern to thereby compute renewedly the distance values. By way of example, for the character pattern inputted and the character pattern stored in the dictionary such as illustrated in FIG. 7C, portions 12, 14, etc. indicated by thick solid lines of the feature elements of the input pattern represented by thick line strokes remain in the state where correspondences to the elements of the dictionary-stored pattern have not been established yet. More specifically, the portion 12 is inputted intermediately between the portions 11 and 13 which bear correspondence to the elements of the dictionary-stored pattern and thus can be interpreted as a portion generated by writing continuously the elements of the dictionary pattern for which correspondences to the portions 11 and 13 can be established. Accordingly, by imparting or assigning a smaller value to the portion 12 than in the case where the interpretation is impertinent, the cursive character can easily be recognized as well.

In this manner, the detail discrimination in the processing 406 shown in FIG. 4 can be performed on the basis of the distance values determined between the input pattern and the dictionary pattern.

More specifically, since the strokes of the character are classified into vertical bars extending upwardly/downwardly and horizontal bars extending leftwardly/rightwardly in the processing 404, the features concerning curving or bending portions of the pattern such as features which enable distinction between curve and angular corner may disappear undesirably. Accordingly, through this processing 406, a detail discrimination dictionary is provided separately from the dictionary 160, and when the character approximated to a similar shape through the cuneiform approximation is not contained in the result of recognition, then the detail discrimination dictionary is referenced for checking the inputted character pattern with regard to the detailed features of the dictionary character pattern, whereon processing for permutating the results of recognition is performed if it is required.

Figure 9:
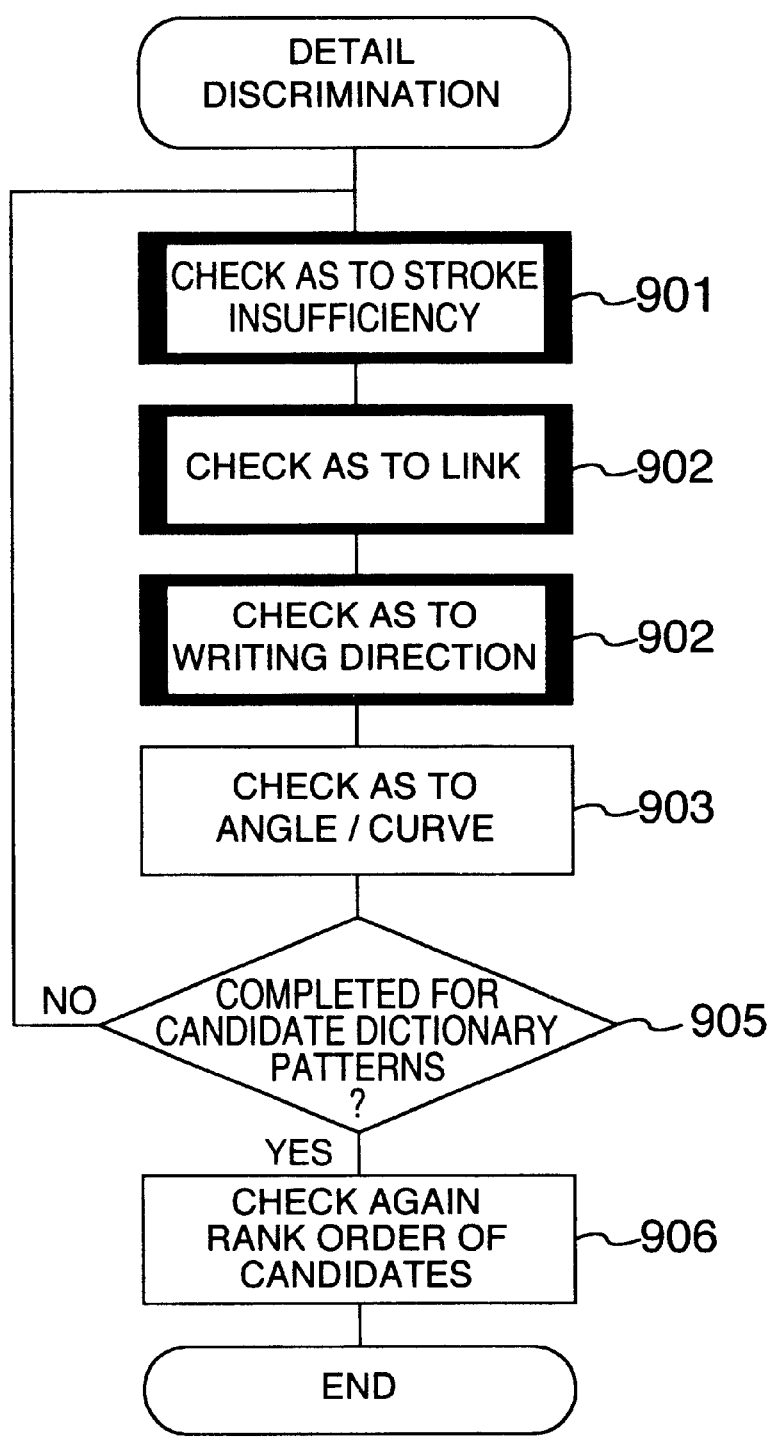
FIG. 9 is a view showing a detail discrimination processing.

A processing flow of this detail discrimination processing 406 is illustrated in FIG. 9.

The detail discrimination is performed for the first to N-th dictionary character patterns in the ascending order of the distance values obtained through the inputted/dictionary character pattern matching processing 405. At first, for the first to N-th dictionary character patterns, a delineation insufficiency check 901, a link check 902, a writing direction check 903 and a angle/curve check 904 are performed in the ascending order of the distance values through the processings 901 to 905.

Figure 10A:
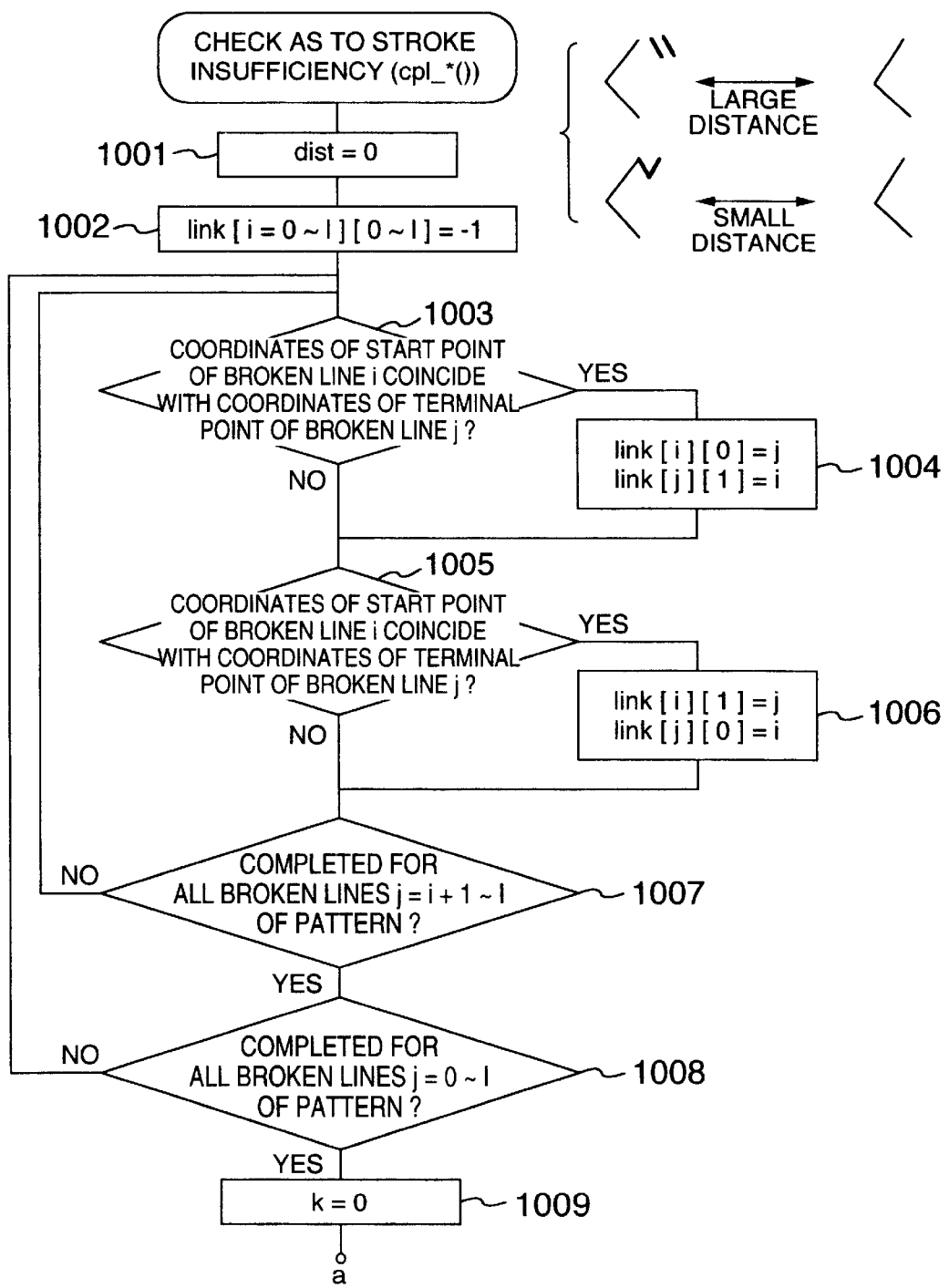
FIGS. 10A and 10B are views showing a stroke or delineation insufficiency check processing.
Figure 10B:
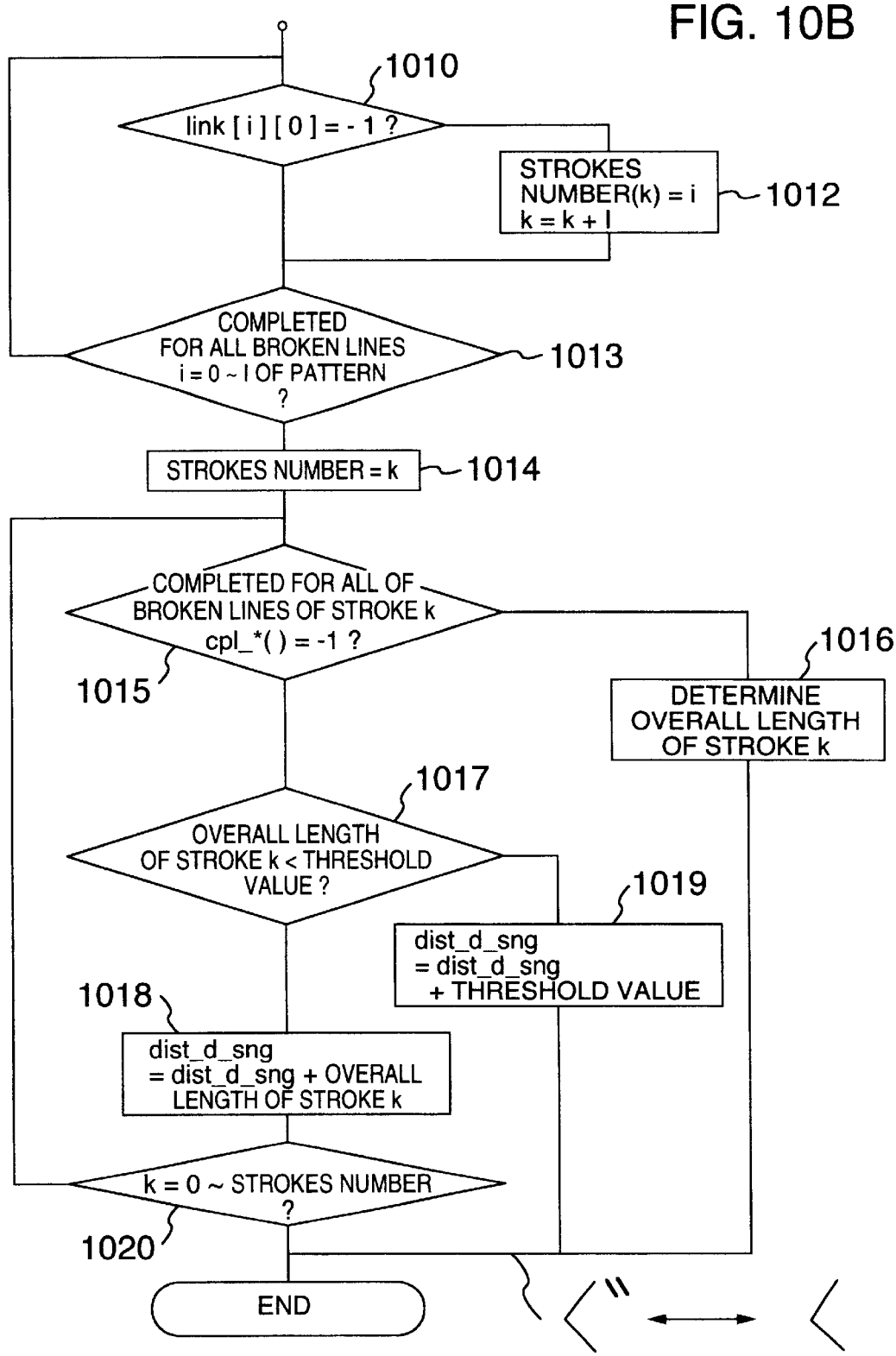

FIGS. 10A and 10B show a processing flow of the stroke or delineation insufficiency check 901. With this processing, penalty of a large value is added to the distance value in the case of stroke insufficiency even for a small element such as voiced sound symbol of "ヾ" shown in FIG. 1A. At first, in a processing step 1001, the distance value "dist" is initialized to "0". Further, in the processing 1002, link information "link [ ][ ]" is initialized to "−1".

Subsequently, through processings 1003 to 1008, for all of broken-line combinations of all the elements for which mutual coincidence is found as to the end point in the processings 1003 to 1007, i.e., for all the linked line segments, link information is placed in "link [ ][ ]" in processing 1004 or 1006. More specifically, the ID number of a line segment having a terminal point coinciding with the start point of a line segment i is placed in "link [i][0]" while the ID number of a line segment having a start point coinciding with the terminal point of the element i is placed in "link [i][1]". Then, the elements inputted through a same number of strokes can be traced in a single continuation by referencing "link [i][1]", wherein the start point of the stroke assumes value of "link [i][0]=−1".

Thus, through the processings 1010 to 1013, the line segment of the value "link [i][0]=−1" is searched, and the line segment ID number is placed at the stroke number (k). Unless correspondence is established for all the line segments contained in the stroke (k), then the overall length of the stroke (k) is added to the distance value as the penalty through the processings 1015 to 1020. In consideration of the case where the voiced sound symbol is inputted with very small strokes, a threshold value is added to the distance value as the penalty instead of the overall length of the stroke (k) in the processing step 1017 when it is smaller than the threshold value mentioned above. In the processing 1015, referencing the line segment ID number i=stroke number (k) to "link [i][1]" while tracing all the line segments contained in the strokes, it is checked whether correspondence has been established for all the line segments covered by the stroke (k) by checking whether "cpl$_{13}$ i(i)" or "cpl$_{13}$ d(j)" is "−1". Similarly, in the processing 1016, the overall length of the strokes is determined by adding together the lengths of all the line segments by tracing continuously all the line segments while referencing "link [i][1]". Although the link information as checked is placed in "link [ ][ ]" in the case of the instant case, the line segment ID numbers contained in the strokes may be placed in "link [ ][ ]" in precedence to the element permutating processing 503 shown in FIG. 5. In that case, however, the dictionary capacity increases if the information of "link [ ][ ]" is held for the dictionary patterns. Accordingly, the input pattern may preferably be placed in "link [ ][ ]" in precedence to the element permutating processing with only the dictionary pattern being set to "link [ ][ ]" in the processing 1006 or 1008 shown in FIG. 10.

Figure 11:
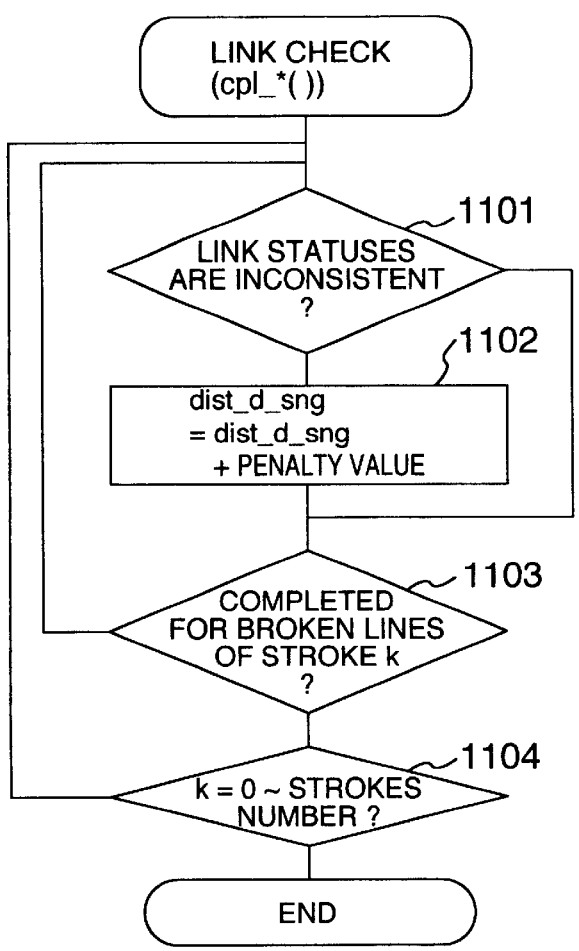
FIG. 11 is a view showing a link check processing.
Figure 11:
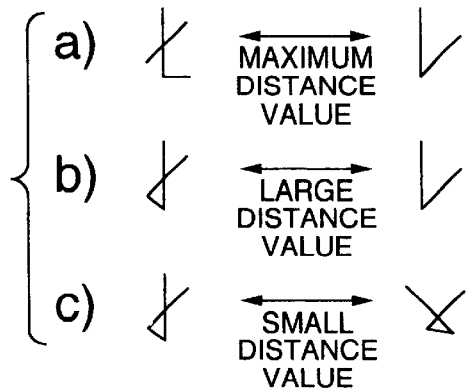

FIG. 11 shows a processing flow of the link check 902 illustrated in FIG. 9. With this processing, a penalty of a proper value is added to the distance value in the case where the link statuses of the elements differ, as exemplified by the pattern "⌫" shown in FIG. 11 and the like. More specifically, a penalty of a maximum value is assigned in the case where one of the dictionary character pattern and the inputted character pattern is given by one continuous stroke while the other is given by two discrete strokes and additionally one stroke is connected to a different element, as in the case of the pattern illustrated at a). Unless the stroke is not connected to the different element, a penalty of a small value should preferably be imposed because the one stroke mentioned above can be regarded as being written in continuation. A penalty is also assigned in the case where one of the dictionary character pattern and the inputted character pattern extends continuously with the other extending continuously but containing an interposing element of different species, as in the case of the pattern illustrated at b). In that case, when the interposing element of different species has a length which is smaller than a predetermined value, a penalty of a predetermined value is selected while when the length of the interposing element exceeds the predetermined value, the value of a penalty to be imposed should preferably be selected in dependence on the length of the interposing element. On the other hand, when both the dictionary character pattern and the inputted character pattern are of a same connection form, as illustrated at c), no penalty is imposed.

The present invention resides in the character recognition technology which is capable of recognizing even the character written in an irregular stroke sequence. In this connection, for recognizing discriminatively utterly same patterns except for the stroke sequence or order, the dictionary pattern and the input pattern may be checked as to coincidence of the stroke order information in the link status check processing.

Figure 12:
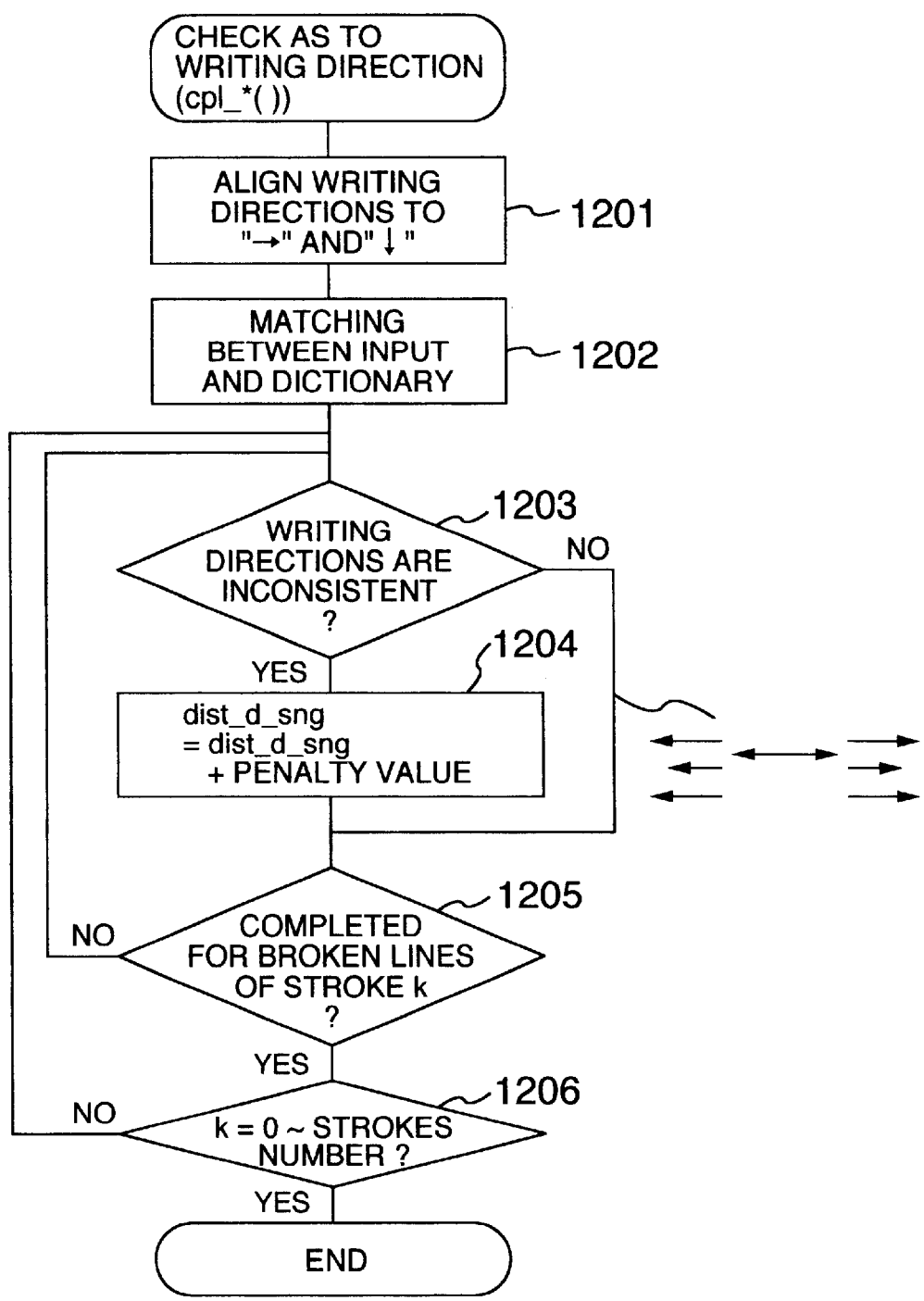
FIG. 12 is a view showing a writing direction check processing.

FIG. 12 shows a processing flow of the writing direction check processing 903. The purpose of this processing is to make it possible to recognize the character even when it is inputted in the reverse writing direction. In a processing 1201, the writing directions for all the elements are aligned in terms of "→" and "↓". When all the elements are horizontal/vertical bars, "↑" is converted to "↓" with "←" being converted to "→", and the relevant conversion information is stored. The element written obliquely is classified into the vertical bar group or the horizontal bar group to be subsequently converted in the manner mentioned above. In a processing 1202, the inputted/dictionary character pattern matching processing described hereinbefore by reference to FIG. 7A is executed. To this end, the matching may be carried out with all the dictionary patterns or alternatively with only high-rank dictionary pattern candidates. Through processings 1203 to 1206, a penalty is assigned to the elements which are incoincident in the writing direction, i.e., the elements whose writing direction differs from the original writing direction.

In this conjunction, before executing the processing 903, check may be performed as to two respects, i.e., (1) whether the writing directions of the elements of the inputted pattern contain many "↑", and "←" and (2) whether no hit candidates can be found because of very large distance value for the candidate of upper rank. Only when the check mentioned above results in affirmation, the processing 903 may be carried out. In this way, the time consumption involved in the processing can be saved.

In this way, for the dictionary patterns set as the candidates, the candidate order is reexamined in the ascending order of the distance values in the processing 906 after the stroke or delineation insufficiency check processing, link check processing, the writing direction check processing and the angle/curve check processing have been carried out.

Thus, on the basis of the results of the detail recognition processing 406 illustrated in FIG. 4, the distance values are outputted in the ascending order as the result of recognition (processing 407).

INDUSTRIAL APPLICABILITY

As described in the foregoing, according to the present invention, there can be provided a character recognition apparatus which can recognize discriminatively even the characters modified due to rough writing, continuous writing and/or irregular stroke sequence with the load for the recognition processing being reduced.

What is claimed is:

1. A character recognizing apparatus, comprising
    an input unit for allowing a handwritten character to be inputted to thereby output a coordinate-points string;
    a dictionary for storing therein a plurality of character codes and a character pattern corresponding to each of the character codes;
    a decomposing unit for decomposing the coordinate-points string outputted from said input unit into a plurality of elements which constitute an input character, said decomposing unit generating a plurality of line segments from the coordinate-point string; and
    a matching unit for obtaining a distance value between the line segments thus generated and line segments of a character pattern stored in said dictionary in a descending order of length of the line segments thus generated for combinations of elements of an input character pattern and elements of each of character patterns stored in said dictionary, and selecting a distance value which becomes a smallest distance between elements irrespective of an input order of the elements.

2. A character recognizing apparatus, comprising:
    an input unit for allowing a handwritten character to be inputted to thereby output a coordinate-points string;
    a dictionary for storing therein a plurality of character codes and a character pattern corresponding to each of the character codes;
    a decomposing unit for decomposing the coordinate-points string outputted from said input unit into a plurality of elements which constitute an input character; and
    a matching unit for selecting a distance value which becomes a smallest distance between elements irrespective of an input order of the elements for combinations of the elements of an input character pattern and elements of each of character patterns stored in said dictionary,
    wherein said decomposing unit traces orderly the coordinate-points string to thereby decompose the coordinate-points string into line segments each having end points at which at least one of X- or Y-coordinates has a maximum or minimum value, compares length of a line segment thus decomposed with length of a stroke constituted by interconnecting the coordinate-points string, and divides the line segment thus compared into two line segments each having an end coinciding with a mid point of the line segment thus compared, on the basis of result of said comparison.

3. A character recognizing apparatus, comprising:

an input unit for allowing a handwritten character to be inputted to thereby output a coordinate-points string;

a dictionary for storing therein a plurality of character codes and a character pattern corresponding to each of the character codes;

a decomposing unit for decomposing the coordinate-points string outputted from said input unit into a plurality of elements which constitute an input character; and a matching unit for selecting a distance value which becomes a smallest distance between elements irrespective of an input order of the elements for combinations of the elements of an input character pattern and elements of each of character patterns stored in said dictionary, wherein after establishing correspondence relationships between broken-line elements of the input character pattern and character patterns stored in said dictionary, said matching unit assigns a greater distance value in a case where there exists no broken-line element corresponding to any broken-line element of strokes constituted by the broken-line elements of the input character or the dictionary pattern, when compared with a case where there exists a broken-line element corresponding to some one of broken-line elements of strokes.

* * * * *